March 4, 1941.  J. H. HALL  2,234,118
CORN HUSKER
Filed Sept. 19, 1939  3 Sheets-Sheet 1

Inventor
JONAS H. HALL, DECEASED,
By FRANCIS E. POOLER
ADMINISTRATOR,

By Clarence A. O'Brien
and Hyman Berman
Attorneys

March 4, 1941.　　　　J. H. HALL　　　　2,234,118
CORN HUSKER
Filed Sept. 19, 1939　　　3 Sheets-Sheet 2
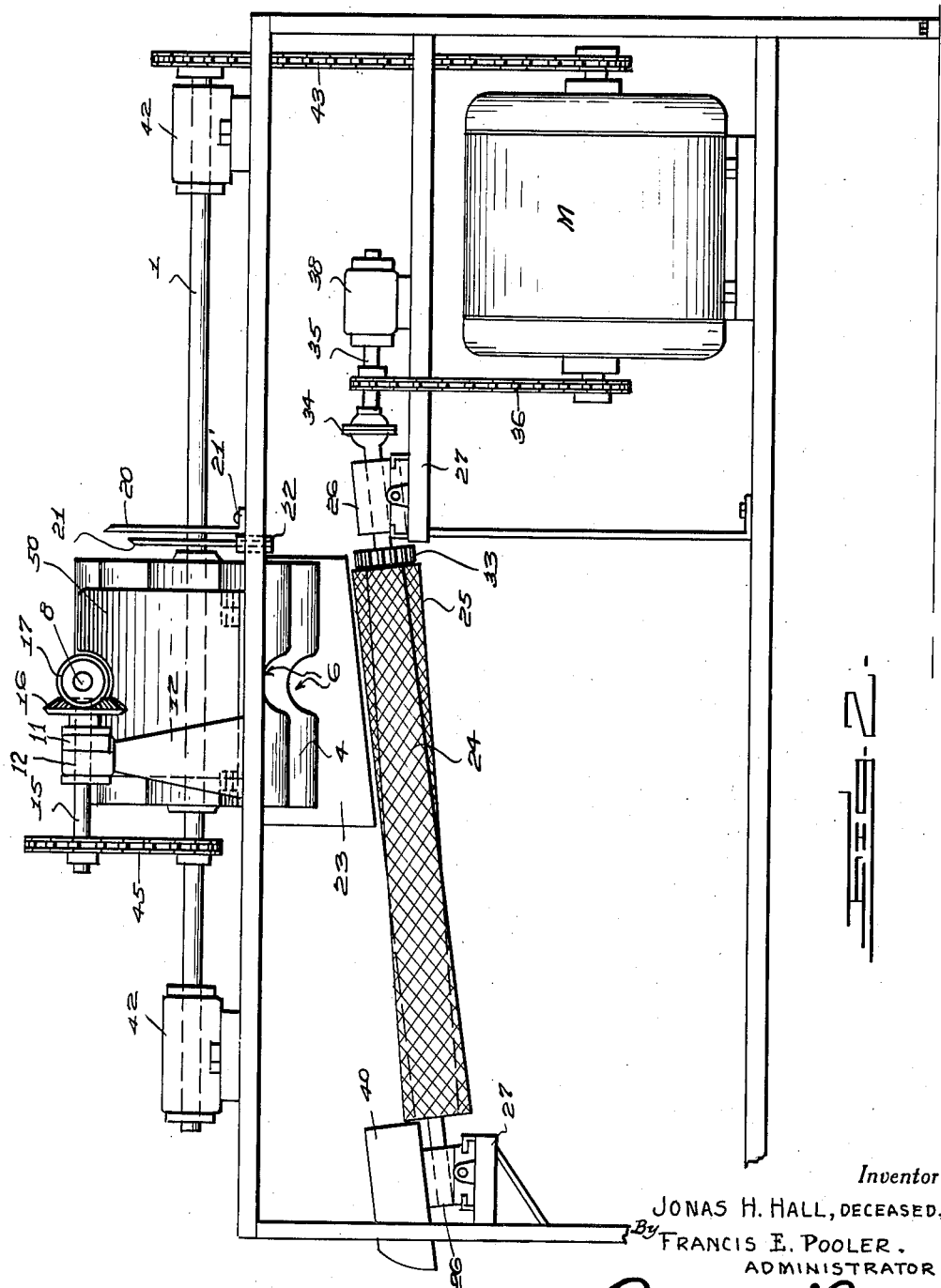
Inventor
JONAS H. HALL, DECEASED,
By FRANCIS E. POOLER,
ADMINISTRATOR,
By Clarence A. O'Brien
and Hyman Berman
Attorneys

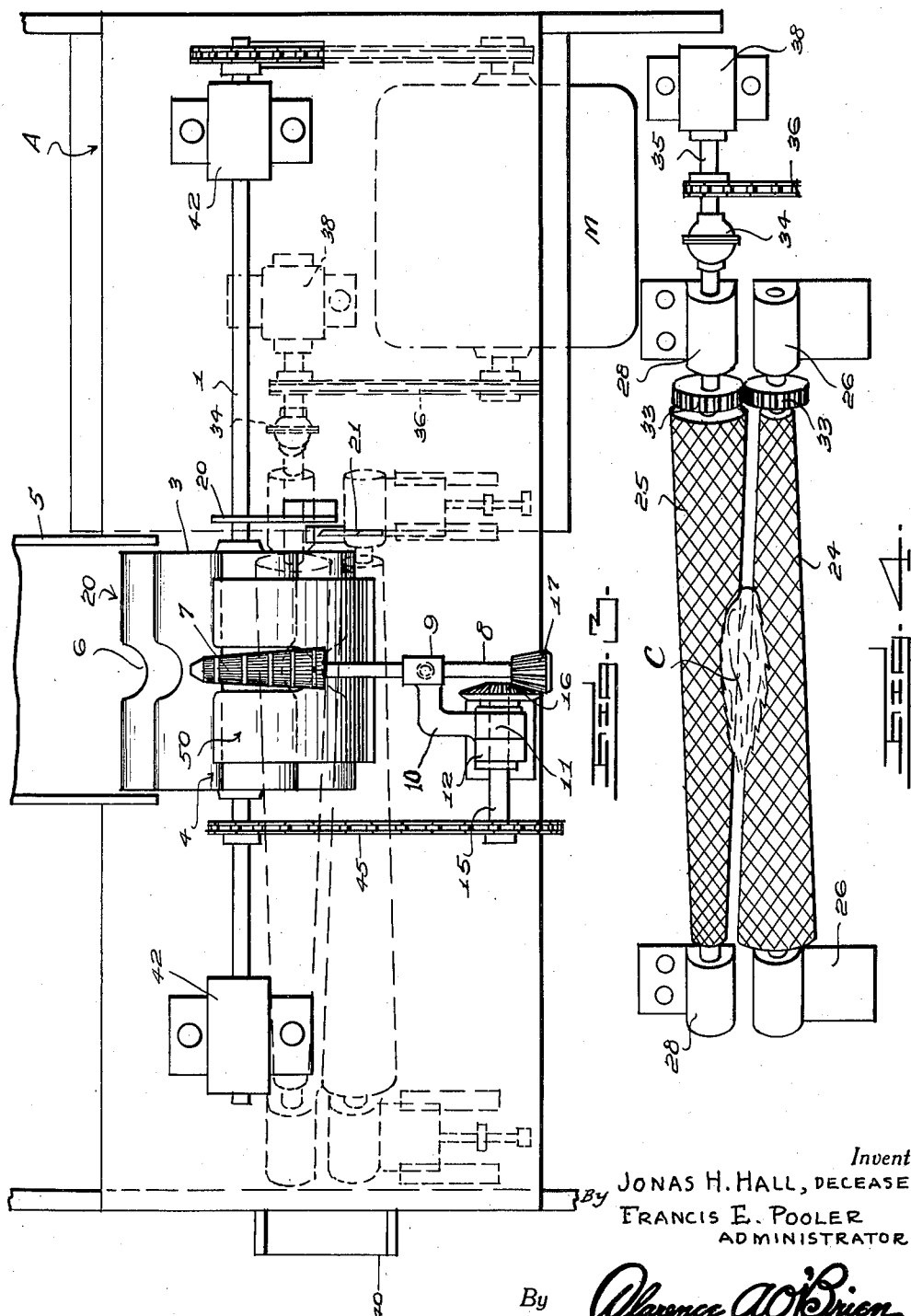

Patented Mar. 4, 1941

2,234,118

UNITED STATES PATENT OFFICE 2,234,118

CORN HUSKER

Jonas H. Hall, deceased, late of Dexter, Maine, by Francis E. Pooler, administrator, Dexter, Maine, assignor of twenty per cent to Peter J. Vincent, twenty per cent to Francis E. Pooler, twenty per cent to Fred A. Abbott, twenty per cent to Clyde F. Mower, and twenty per cent to Harry F. Wilkins, all of Dexter, Maine Application September 19, 1939, Serial No. 295,679

3 Claims. (Cl. 146—84)

This invention relates to a corn husker, the general object of this invention being to provide means for cutting off the butts of ears of green corn and then removing the husks and "silk" from the ears after which the husked ears pass into a trough.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 2 is a side view thereof.

Figure 3 is a top plan view thereof.

Figure 4 is a plan view of a pair of husking rollers and the means for actuating the same.

Figure 1:
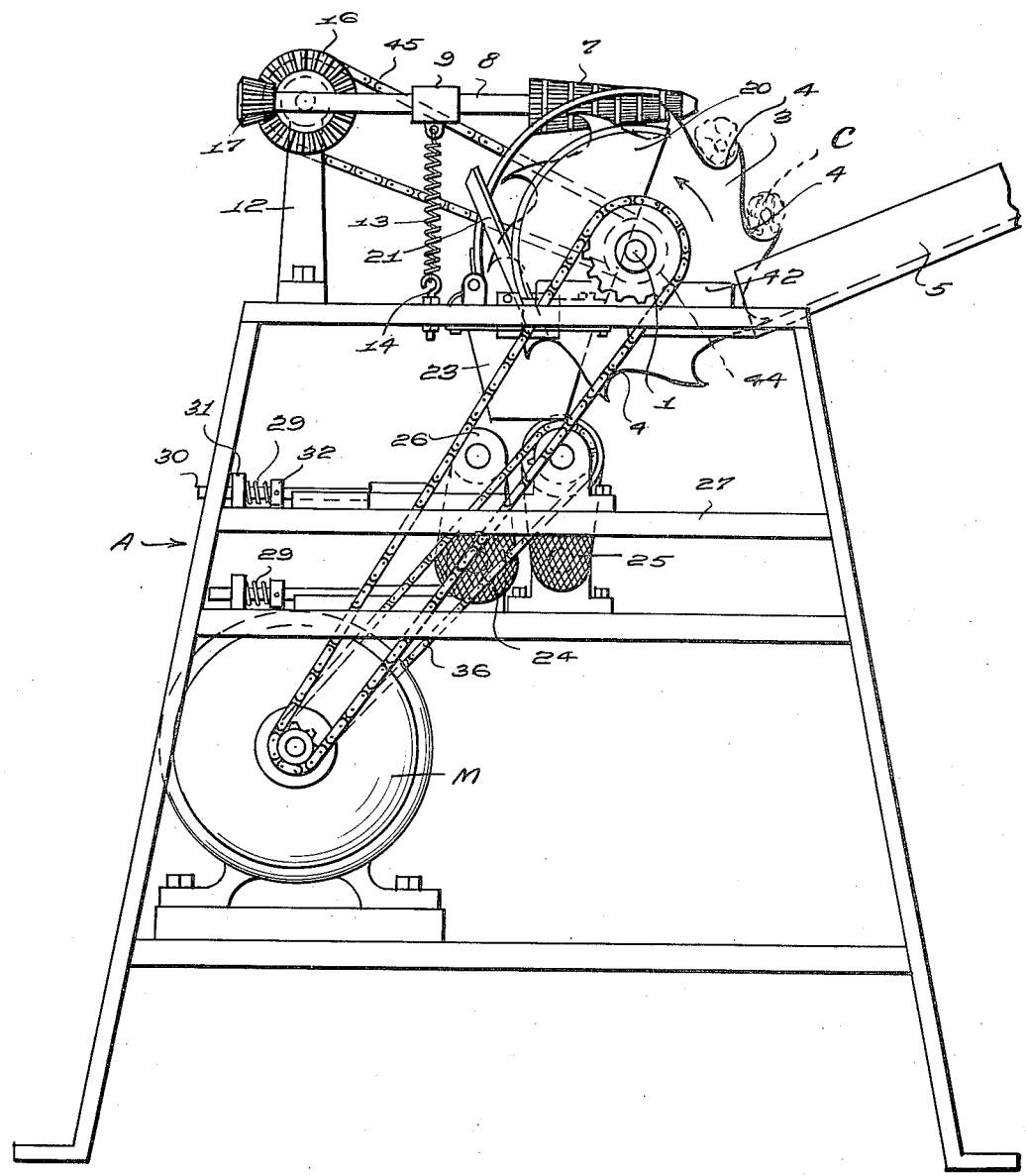
Figure 1 is an end view of the apparatus.

In these views, the letter A indicates an upright frame on the top of which is journaled a shaft 1 by the bearing members 42 and said shaft carries a drum 3, the periphery of which is formed with a plurality of troughs 4 which extend longitudinally of the drum and are so formed that as the drum revolves said troughs will pick up ears of corn C from an inclined trough 5 which has its discharge end located adjacent the drum as shown in Figure 1. The drum on the trough forming portions thereof is formed with a circumferentially extending annular groove 6 which permits the drum to pass the tapered pusher member 7 carried by a shaft 8 which is supported for rotary movement in a bearing sleeve 9 carried by an angle arm 10 which is connected to a sleeve 11 supported for rotary movement on an upright 12 rising from the top of the main frame. A spring 13 has one end connected with the bearing sleeve 9 and its other end to a hook 14 which is adjustably connected with a part of the main frame so that the tension of the spring can be regulated and this spring tends to hold the pusher member 7 in yielding engagement with the grooved part of the drum. A shaft 15 is journaled in the upright 12 and has a beveled gear 16 thereon which meshes with a beveled pinion 17 on the shaft 8, these parts being so constructed and arranged that the pinion 17 will remain in mesh with the gear 16 during any rocking movement of the shaft 8 under the action of the spring 13 and the engagement of the member 7 with the ears of corn.

This member 7 has its small end arranged to engage the ears as the ears move upwardly in the troughs of the drum which is rotated in an anti-clockwise direction as shown by the arrow in Figure 1. This member 7 is roughened by longitudinally extending and annular extending grooves and ribs and its function is to push the ears of corn to the near side of the drum as shown in Figure 1, the member 7 engaging the small ends of the ears and pressing the butts of the ears against the stop plate 20 which is of arcuate shape and is suitably supported from the top of the main frame as shown at 21' in Figure 2. As the drum revolves with the butts of the ears sliding over the plate 20 they are brought against the knife 21 which is detachably held in a socket 22 carried by the top of the main frame. This knife will cut off the butts from the ears and then upon continued movement of the drum the troughs discharge the ears into the depending chute 23 which depends from the top of the main frame and said chute deposits the ears on the pair of husking rolls 24 and 25, each of which is of the tapered formation shown in Figure 4 with the large end of the roll 24 located adjacent the small end of the roll 25 and these rolls are roughened in the usual manner so as to remove husks from the ears. The rolls are slightly spaced apart and the roll 24 has its ends journaled in the bearing members 26 which are slidably supported on the horizontal portions 27 of the frame and these bearing members are yieldingly moved toward the bearing members 28 of the roller 25 by the spring means 29 on the rods 30 connected with the bearing members 26 and guided by the guide means 31, each spring bearing against a guide member 31 and against a collar 32 on a rod as shown in Figure 1. A pair of inter-meshing gears 33 is carried by the spindles of the two rolls 24 and 25 and these gears have long teeth so that they will continue to engage each other even when the two rolls are separated to a considerable extent. The spindle of roll 25 is extended and is connected by a universal joint 34 to a shaft 35 which is driven from the shaft of a motor M, supported on a lower part of the main frame, by the chain 36 passing over suitable sprockets on the motor shaft and said shaft 35, the shaft 35 at its outer end being journaled in the bearing means 38. As shown more particularly in Figure 2 the rolls 24 and 25 slope downwardly and outwardly from the inner ends to the outer ends so that the ears of corn will gravitate from the point where they drop upon the rolls from the chute 23 toward the outer ends of the rolls and from said outer ends of the rolls the ears of corn pass into a sloping chute 40 which can discharge into a suitable receptacle. Of course, the rollers 24 and 25 will strip the husks from the ears and these husks will pass between the rollers while the ears of corn with the husks removed will gravitate down the rolls and pass into the chute 40. The shaft 1 is driven from motor M by a chain 43 which passes over a sprocket 44 on the shaft 1, and a sprocket on the motor shaft. Shaft 1 drives shaft 15 by the chain and sprocket means shown generally at 45. From the foregoing it will be seen that by placing the ears of corn in chute 5, said ears will gravitate down the chute and then the ears will be picked up by the drum 3 and as the ears near the top of the drum the pusher member 7 will engage them and move them longitudinally in the troughs until their butts engage the plate 20. Then as the drum continues to rotate the butt ends of the ears are cut off by the knife 21 and then the ears will drop through the chute 23 upon the husking rollers 24 and 25 which remove the husks and the ears slide down the rollers so that they are thoroughly cleaned before reaching the lower ends of the rollers and from said lower ends the ears, free of husks and other matter, will pass into the chute 40.

The pusher member revolves slowly while the husking rollers revolve at high speed so as to thoroughly remove the husks and refuse from the ears.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A husking machine of the class described comprising a frame, an inclined chute having its lower end arranged adjacent a top part of the frame, a horizontally arranged drum rotatably supported at the top of the frame and having trough-shaped parts extending longitudinally at its periphery, said trough-shaped parts picking up the ears of corn from the chute, said drums having a circumferentially extending groove therein which intersects the troughs, a stop plate located adjacent one end of the drum, means extending into a part of the groove for moving the ears of corn in the troughs to place the butt ends against said stop plate, and a knife adjacent the stop plate for cutting off the butt ends of the ears during the rotation of the drum.

2. A husking machine of the class described comprising a frame, a horizontally arranged drum rotatably supported by the frame and having longitudinally extending troughs in its periphery, a member extending across the top of the drum and of tapered shape for forcing ears of corn in the trough toward one end of the drum, a stop plate adjacent one end of the drum for limiting sliding movement of the ears in said troughs, a knife for cutting off the butt ends of the ears during the rotary movement of the drum, a chute for receiving the ears of corn from the trough, and means for rotating the drum and the member which extends over the drum.

3. A husking machine of the class described comprising a frame, a drum journaled for rotation about a horizontal axis in the frame and having longitudinally extending troughs in its periphery for receiving ears of corn and said drum having an annular groove in its periphery intersecting the troughs, an elongated and tapered pusher member passing through the upper portion of the groove for forcing the ears of corn toward one end of the drum, a stop member carried by the frame and located adjacent said end of the drum for limiting movement of the ears of corn by said pusher member, a knife for cutting off the butt ends of the ears, said knife being supported by the frame adjacent the stop plate and against which the ears are brought by rotary movement of the drum, yieldable means for moving the pusher member downwardly into the groove, and means for rotating the pusher member and the drum.

FRANCIS E. POOLER,
*Administrator of the Estate of Jonas H. Hall, Deceased.*